US009102321B2

(12) United States Patent
Eich (10) Patent No.: US 9,102,321 B2
(45) Date of Patent: Aug. 11, 2015

(54) HYBRID VEHICLE SYSTEM AND CONTROL METHOD FOR ENHANCING STARTUP FLARE CONTROL

(71) Applicant: Honda Motor Co., Ltd., Tokyo (JP)

(72) Inventor: Steven M. Eich, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 13/959,856

(22) Filed: Aug. 6, 2013

(65) Prior Publication Data
US 2015/0045999 A1   Feb. 12, 2015

(51) Int. Cl.
*B60W 20/00* (2006.01)
*B60W 10/06* (2006.01)
*B60W 10/08* (2006.01)
*B60W 10/26* (2006.01)

(52) U.S. Cl.
CPC ............ *B60W 20/108* (2013.01); *B60W 10/06* (2013.01); *B60W 10/08* (2013.01); *B60W 10/26* (2013.01); *B60W 20/40* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 4,561,530 A * | 12/1985 | Parsons et al. | ............... | 477/176 |
| 5,195,398 A * | 3/1993 | Murrish et al. | ................ | 74/603 |
| 6,253,127 B1 * | 6/2001 | Itoyama et al. | ................ | 701/22 |
| 6,322,478 B1 * | 11/2001 | Jackson | ....................... | 477/109 |
| 6,612,386 B2 * | 9/2003 | Tamai et al. | .............. | 180/65.25 |
| 7,220,217 B2 * | 5/2007 | Tamai et al. | .................. | 477/183 |
| 8,157,035 B2 * | 4/2012 | Whitney et al. | .......... | 180/65.265 |
| 8,380,405 B2 * | 2/2013 | Matsuda et al. | ................ | 701/54 |
| 2007/0255488 A1 * | 11/2007 | Okubo et al. | ................ | 701/110 |
| 2009/0063028 A1 * | 3/2009 | Aitchison et al. | ............ | 701/113 |
| 2012/0150371 A1 * | 6/2012 | Swales et al. | ................... | 701/22 |
| 2013/0005530 A1 * | 1/2013 | Fujikawa et al. | ................ | 477/5 |

OTHER PUBLICATIONS

International Search Report and Written Opinion of PCT/US2014/045143 dated Nov. 7, 2014, 8 pages.

* cited by examiner

*Primary Examiner* — Thomas Tarcza
*Assistant Examiner* — Richard Goldman
(74) *Attorney, Agent, or Firm* — Rankin, Hill & Clark LLP (57) ABSTRACT

A hybrid vehicle system and control method for enhancing startup flare control includes receiving a start signal for starting an internal combustion engine from a start engine actuator and starting the internal combustion engine, increasing a throttle open angle in response to the start signal to increase engine speed upon starting of the internal combustion engine and, after a desired engine speed is reached, engaging an electric motor with the internal combustion engine to add a drag force on the internal combustion engine thereby rapidly reducing engine speed.

21 Claims, 5 Drawing Sheets

Fig. 3

HYBRID VEHICLE SYSTEM AND CONTROL METHOD FOR ENHANCING STARTUP FLARE CONTROL

BACKGROUND

Certain supercars, such as the Ferrari 458 Italia, provide an engine speed flare during startup. In particular, these vehicles have an engine speed profile that includes a very short duration rise to a relatively high peak flare speed followed by a short duration decrease to an engine idle speed. This combination can be referred to as an engine speed flare. Such a high peak flare speed and such a rapid rise and fall in the startup engine speed profile (i.e., engine speed flare), which simulates racecar-like response, is possible in these supercars, including in the Ferrari 458 Italia, due to the use of a lightweight reciprocating assembly and/or a high performance engine that provides a large compression ratio, particularly as compared to conventional vehicle engines. The use of a lightweight reciprocating assembly can include the provision of an engine arrangement suitably employing a single plane crankshaft. Unlike conventional multi-pin counterweighted crankshafts, the single plane crankshaft has a reduced mass and therefore can be increased to a desired engine speed much faster than a conventional engine.

Figure 1A:
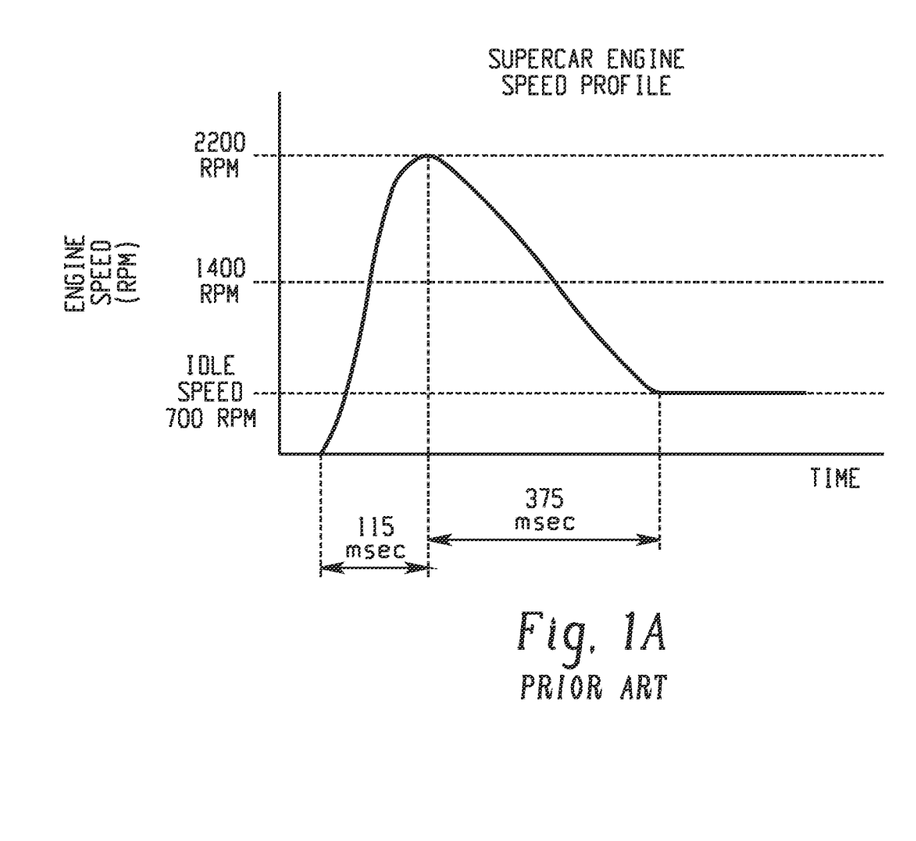
FIG. 1A shows a timing chart illustrating a supercar engine speed profile.

With reference to FIG. 1A, an example supercar engine speed profile is shown. This engine speed profile, which can be the engine speed profile found on the Ferrari 458 Italia vehicle and used particularly at startup, has a small throttle blip that results in the illustrated supercar engine speed profile wherein the engine increases at startup to a peak flare speed (e.g., 2200 RPM) in a very short duration (e.g., 115 msec) and then rapidly decreases to an engine idle speed (e.g., 700 RPM) in slightly longer, but still very short, duration (e.g., 375 msec). As mentioned above, this desired engine speed profile of the supercar is possible due to the use of a lightweight reciprocating assembly (e.g., including a single plane crankshaft without counterweights) and/or a large compression ratio engine.

Figure 1B:
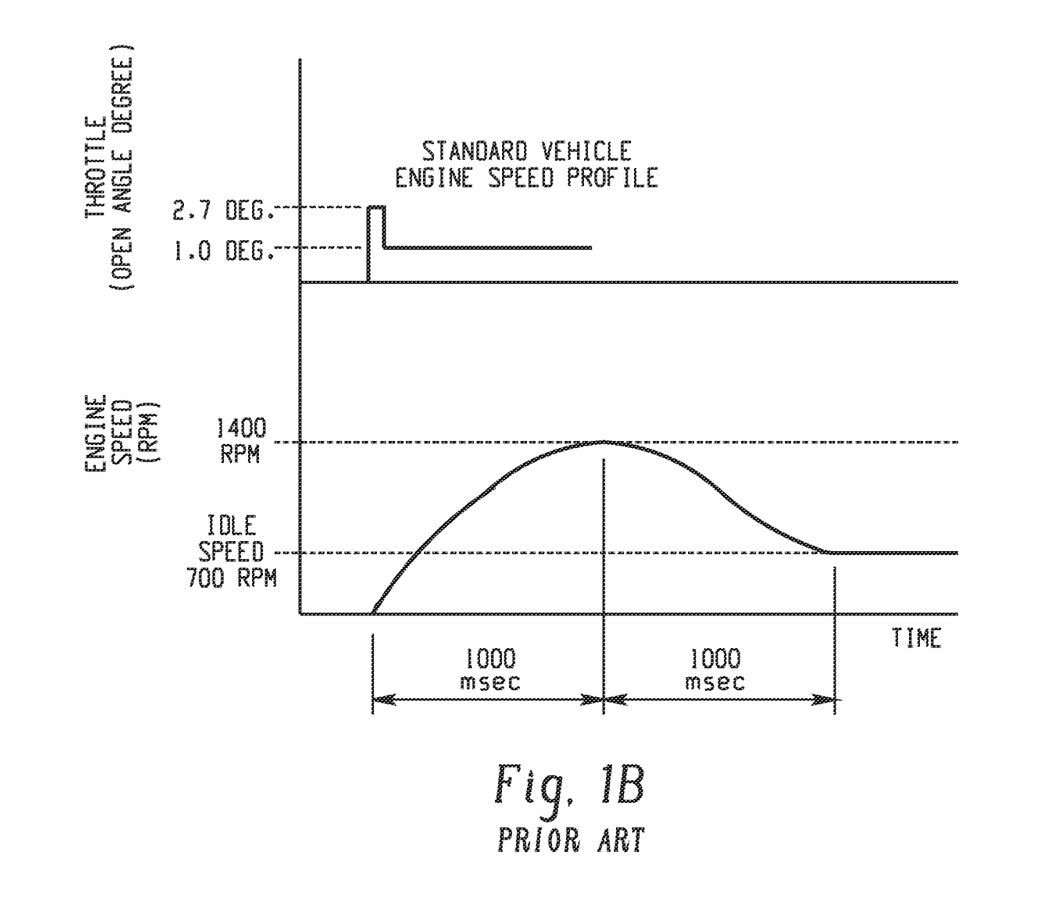
FIG. 1B shows a timing chart illustrating a standard vehicle engine speed profile with a corresponding throttle profile shown thereabove.

In contrast, with reference to FIG. 1B, an example standard vehicle engine speed profile is shown with a corresponding throttle profile shown immediately thereabove. This engine speed profile, which can be the engine speed profile for a conventional sedan-type vehicle, has the illustrated small throttle blip (e.g., opening the throttle to 2.7 degrees) resulting in the illustrated standard vehicle engine speed profile. As shown, the peak flare speed (e.g., 1,400 RPM) is reduced relative to supercar engine speed profile of FIG. 1A and the rise and fall duration of the flare (e.g., 1,000 msec for each of the rise and the fall) is very long and occurs for a much longer duration as compared to the supercar vehicle flare profile. This slower response can be caused by the relatively large rotational inertia associated with more conventional engines (e.g., due to the use of a multi-pin counterweight crankshaft).

SUMMARY

According to one aspect, a hybrid vehicle system with enhanced startup flare control includes an internal combustion engine for providing motive vehicle power, a start engine actuator for starting the internal combustion engine and an electric motor selectively coupled to the internal combustion engine for generating electric power from the internal combustion engine. The system further includes a throttle control valve disposed within an engine intake associated with the internal combustion engine. The throttle control valve is arranged such that increasing an open angle of the throttle control valve increases an engine speed of the internal combustion engine. The system can additionally include at least one control unit operatively connected to the start engine actuator, the throttle control valve and the electric motor. The at least one control unit is configured to start the internal combustion engine upon actuation of the start engine actuator, increase the open angle of the throttle control valve to increase engine speed of the internal combustion engine and couple the electric motor to the internal combustion engine to rapidly decrease engine speed when the internal combustion engine reaches a desired peak engine speed.

According to another aspect, a control method for enhancing startup flare control on a hybrid vehicle includes receiving a start signal for starting an internal combustion engine from a start engine actuator and starting the internal combustion engine, increasing a throttle open angle in response to the start signal to increase engine speed upon starting of the internal combustion engine, engaging an electric motor with the internal combustion engine and, after a desired engine speed is reached, operating the electric motor add a drag force on the internal combustion engine thereby rapidly reducing engine speed.

According to a further aspect, the startup flare control method for an internal combustion engine includes receiving an engine start signal for the internal combustion engine, increasing a throttle open angle of a throttle valve associated with the internal combustion engine immediately upon starting of the engine, and engaging an electric motor with the internal combustion engine and operating the electric motor to reduce engine speed of the internal combustion engine to an engine idle speed.

DETAILED DESCRIPTION

Figure 2:
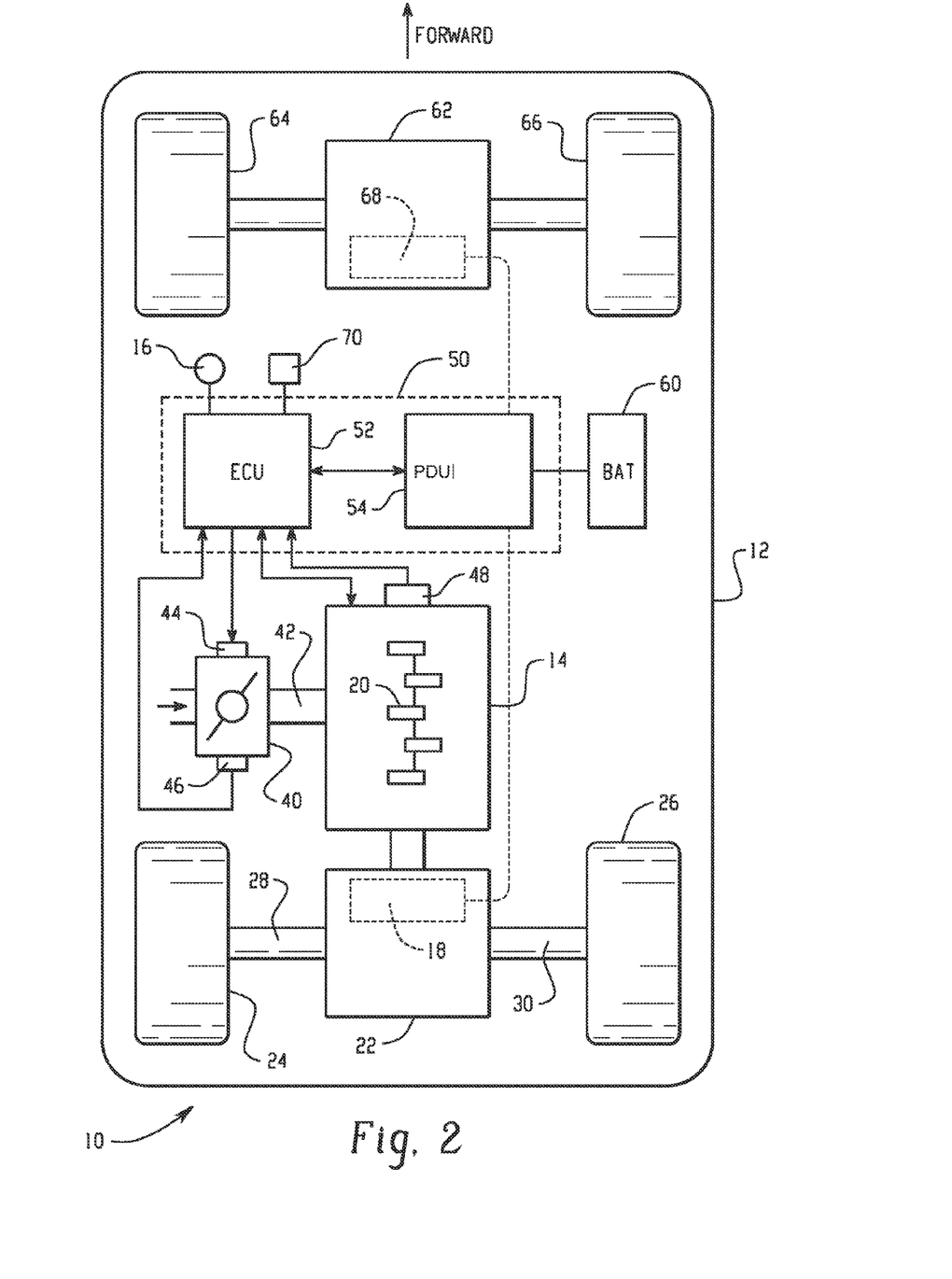
FIG. 2 is a schematic view of a hybrid vehicle system with enhanced startup flare control according to one exemplary embodiment.

Referring now to the drawings wherein the showings are for purposes of illustrating one or more exemplary embodiments and not for purposes of limiting same, FIG. 2 schematically illustrates a hybrid vehicle system 10 with enhanced startup flare control for the illustrated vehicle 12. The hybrid vehicle system 10 and the vehicle 12 include an internal combustion engine 14 for providing motive vehicle power to the vehicle 12 and a start engine actuator 16 for starting the internal combustion engine 14. As will be described in more detail below, the hybrid vehicle system 10 and the vehicle 12 can also include an electric motor 18 that is selectively coupled to the internal combustion engine 14, normally for generating electric power from the internal combustion engine 14. In one exemplary embodiment, the internal combustion engine 14 can be a high rotational inertia internal combustion engine. For example, the internal combustion engine 14 can include a multi-pin counterweight crankshaft 20 as is known and understood by those skilled in the art.

In the illustrated embodiment, the electric motor 18 is associated with or forms a component within a transmission 22 of the vehicle 12, though this is not required and the electric motor 18 could be separately provided. The transmission 22 provides motive power from the internal combustion engine 14 to one or more wheels of the vehicle 12, and particularly to the rear wheels 24, 26 via axles 28, 30 in the illustrated embodiment. The transmission 22 also functions as a differential for the axles 28, 30 and thus is able to proportion motive power between the axles 28, 30 for the rear wheels 24, 26. Within the transmission 22, in an exemplary embodiment, the electric motor 18 is selectively couplable (e.g., to the internal combustion engine 14) to generate power by converting motive power from one or both the internal combustion engine 14 and the rear wheels 24, 26 and optionally is able to provide motive power for the wheels 24, 26.

The electric motor 18 can be selectively couplable within the transmission 22 so that, in an engaged state, the electric motor 18 is coupled to the internal combustion engine 14 and/or the wheels 24, 26 and, in a disengaged state, is decoupled from the internal combustion engine 14 and/or the wheels 24, 26. While in the engaged state, in an exemplary embodiment, the electric motor 18 can be operated in one of two modes, including a first mode wherein the electric motor 18 functions as a generator and a second mode wherein the electric motor 18 functions to provide motive power for the vehicle 12. For example, when in the engaged state and in the first mode, driving force from the rear wheels 24, 26 can be transmitted to the electric motor 18 when the vehicle 12 decelerates and such driving force can be converted to kinetic energy by the electric motor that can be stored as electric energy. Likewise, motive force from the internal combustion engine 14 can be transmitted to the electric motor 18 when in the engaged state and in the first mode and such motive force can be converted to kinetic energy by the electric motor 18 that can be stored as electric energy. In this manner, the electric motor 18 is configured to execute regeneration in response to a driving state of the vehicle 12 and thereby generate electric energy for storage. In the second mode, the electric motor 18 can function to provide motive force to the rear wheels 24, 26 in addition to or in substitution for the internal combustion engine 14, though this is not required and the second mode need not be included in the hybrid vehicle system 10.

As is known and understood by those skilled in the art, a throttle control valve 40 can be disposed within an engine intake manifold 42 associated with the internal combustion engine 14. The throttle control valve 40 can be particularly arranged such that increasing an open angle of the throttle control valve 40 increases an engine speed of the internal combustion engine 14. The throttle control valve 40 can be provided with a throttle valve controller 44 and a throttle angle sensor 46. An engine speed sensor 48 can be disposed on or in association with the internal combustion engine 14 for sensing or measuring engine speed of the internal combustion engine 14.

The hybrid vehicle system 10 can additionally include at least one control unit 50 operatively connected to the start engine actuator 16, the throttle control valve 40, and the electric motor 18. As will be described in more detail below, in one exemplary embodiment, the at least one control unit 50 can be configured to start the internal combustion engine 14 upon actuation of the start engine actuator 16, increase the open angle of the throttle control valve 40 to rapidly increase engine speed of the internal combustion engine 14, and couple the electric motor 18 to the internal combustion engine 14 to rapidly decrease engine speed when the internal combustion engine 14 reaches a desired peak engine speed. In an alternate exemplary embodiment, the at least one control unit 50 can be configured to start the internal combustion engine 14 upon actuation of the start engine actuator 16, increase the open angle of the throttle control valve 40, couple the electric motor 18 to the internal combustion engine 15 to assist in rapidly increasing engine speed and then reserve so function as a drag on the internal combustion engine 14 to rapidly decrease engine speed when the internal combustion engine 14 reaches a desired peak engine speed.

The engine speed sensor 48 is particularly arranged to sense or measure the engine speed of the internal combustion engine 14 and communicate the sensed engine speed to the at least one control unit 50. For example, the engine speed sensor 48 can communicate the sensed engine speed to the at least one control unit 50 when the internal combustion engine 14 reaches the desired peak engine speed so that the at least one control unit 50 is advised of the desired peak engine speed having been reached. In the illustrated embodiment of FIG. 2, the at least one control unit 50 includes an electronic control unit (ECU) 52 associated with the internal combustion engine 14 and a power drive control unit (PDU) 54 associated with the transmission 22, and particularly with the electric motor 18 of the transmission 22, though it is to be appreciated by those skilled in the art that the electronic control unit 52 and the power drive control unit 54 can be combined or separated into a different number of control units.

The hybrid vehicle system 10 can further include a battery 60 operatively connected to one or more of the electric motor 18, the at least one control unit 50, and the electric motor 18. In the illustrated embodiment, the power drive control unit 54 operatively and selectively connects the battery to the electric motor 18. For example, the power drive control unit 54 can connect the battery 60 to the electric motor 18 for recharging the battery 60 by the electric motor 18 (i.e., receive electric energy generated by the electric motor 18) or for receiving stored energy from the battery 60 for powering the rear wheels 24, 26.

A front drive unit 62 can be provided in association with front wheels 64, 66 of the vehicle 12. The front drive unit 62 can include an electric motor 68 similar to the transmission 22 including the electric motor 18 and can serve a differential function similar to the transmission 22 but in connection with the front wheels 64, 66. As shown, the electric motor 68 can be operatively connected to the at least one control unit 50, and particularly to the power drive control unit 54. Like the electric motor 18, the electric motor 68 can provide motive power for the vehicle 12 by using stored energy from the battery 60 and converting the same to motive power for the front wheels 64, 66 and/or can provide a power generative function whereby motive power from the front wheels 64, 66 can be converted to kinetic energy and passed to the battery 60 for storage.

The throttle valve controller 44 can be associated with the throttle control valve 40 for controlling the open angle of the throttle control valve 40. As shown, the throttle valve controller 44 can be operatively connected to the at least one control unit 50 for control thereby. The throttle angle sensor 46 can be associated with the throttle control valve 40 for sensing or measuring the open angle of the throttle control valve 40. The throttle angle sensor 46 can be operatively connected to the at least one control unit 50 for communicating the sensed open angle of the throttle control valve 40 to the at least one control unit 50. Accordingly, the throttle angle sensor 46 functions as a feedback device that provides feedback to the at least one control unit 50 so that the at least one control unit 50 can effectively and accurately control the throttle control valve 40 via the throttle valve controller 44.

As shown, the hybrid vehicle system 10 can further include a mode selector switch 70 for selecting a driving mode for the internal combustion engine 14. As shown, the mode selector switch 70 can be operatively connected to the at least one control unit 50 (e.g., to the electronic control unit 52). In one embodiment, desired peak engine speed for enhanced startup flare control is set according to the driving mode selected via the mode selector switch 70. The driving mode is particularly a selected mode from any number of different driving modes and, in one embodiment, is a selected mode from at least two different driving modes. For example, a first driving mode could be a sporty driving mode and a second driving mode could be a recreational driving mode. The desired peak engine speed for enhanced startup flare control on the internal combustion engine 14 can correspond to a driving mode (i.e., the selected mode) input via the driving mode selector switch 70 that is operatively connected to the at least one control unit 50.

With reference back to FIG. 1B, the vehicle 12 can have the standard vehicle engine speed profile due to the internal combustion engine 14 having high rotational inertia (e.g., due to inclusion of the multi-pin counterweight crankshaft 20) when operated conventionally. Thus, as shown, the engine speed profile at startup would include a very long total time including a long rise (1000 msec) when flare to a peak engine speed (e.g., 1400 RPM) is achieved followed by a long fall (e.g., 1000 msec) to a vehicle idle speed (e.g., 700 RPM). This standard vehicle flare profile can sound slow and lethargic. In other words, the sound profile can be seemingly un-sporty and thus not desirable for the vehicle 12.

Advantageously, the hybrid vehicle system 10 illustrated in FIG. 2 can simulate the desired engine speed profile of a supercar (e.g., Ferrari 458 Italia) at engine start up, or at least can be tuned to approach the desired engine speed profile of the supercar. In particular, the vehicle hybrid system 10 can achieve a simulated engine speed profile that approaches more closely (i.e., more closely than the standard vehicle engine speed profile of FIG. 1B) the desired engine speed profile of a supercar by applying a relatively large throttle input (e.g., opening the throttle to 5.7 degrees) to the internal combustion engine 14 and then engaging the electric motor 18 to tailor the resulting flare. In one embodiment, the at least one control unit 50 operates via the throttle valve controller 44 and the throttle angle sensor 46 to operate the throttle control valve 40 to open the throttle control valve 40 significantly to rapidly increase engine speed. For example, the throttle control valve 40 can be opened to a throttle open angle of 5.7 degrees The larger throttle input reduces the time it takes the internal combustion engine 14 to reach the desired engine speed (e.g., 2200 RPM) than it would otherwise take for the internal combustion engine 14 to reach the desired engine speed. However, without some additional control, the engine speed would continue to increase beyond the desired peak flare speed (i.e., the resulting flare would have a larger peak speed and a much longer duration than that simulating the supercar startup flare). To avoid this, the hybrid vehicle system 10 engages the electric motor 18 of the vehicle 12 to the internal combustion engine 14 such that the engine speed peaks at the desired speed (e.g., 2200 RPM) and then rapidly decreases to the desired idle speed (e.g., 700 RPM). That is, the electric motor 18 is coupled to the internal combustion engine 14 to put a load on the internal combustion engine 14 and more rapidly reduce the speed of the internal combustion engine 14 than would be achieved without loading. Advantageously, this technology defeats the mechanical impediments of some internal combustion engines and provides the feel of a racing engine.

Figure 3:
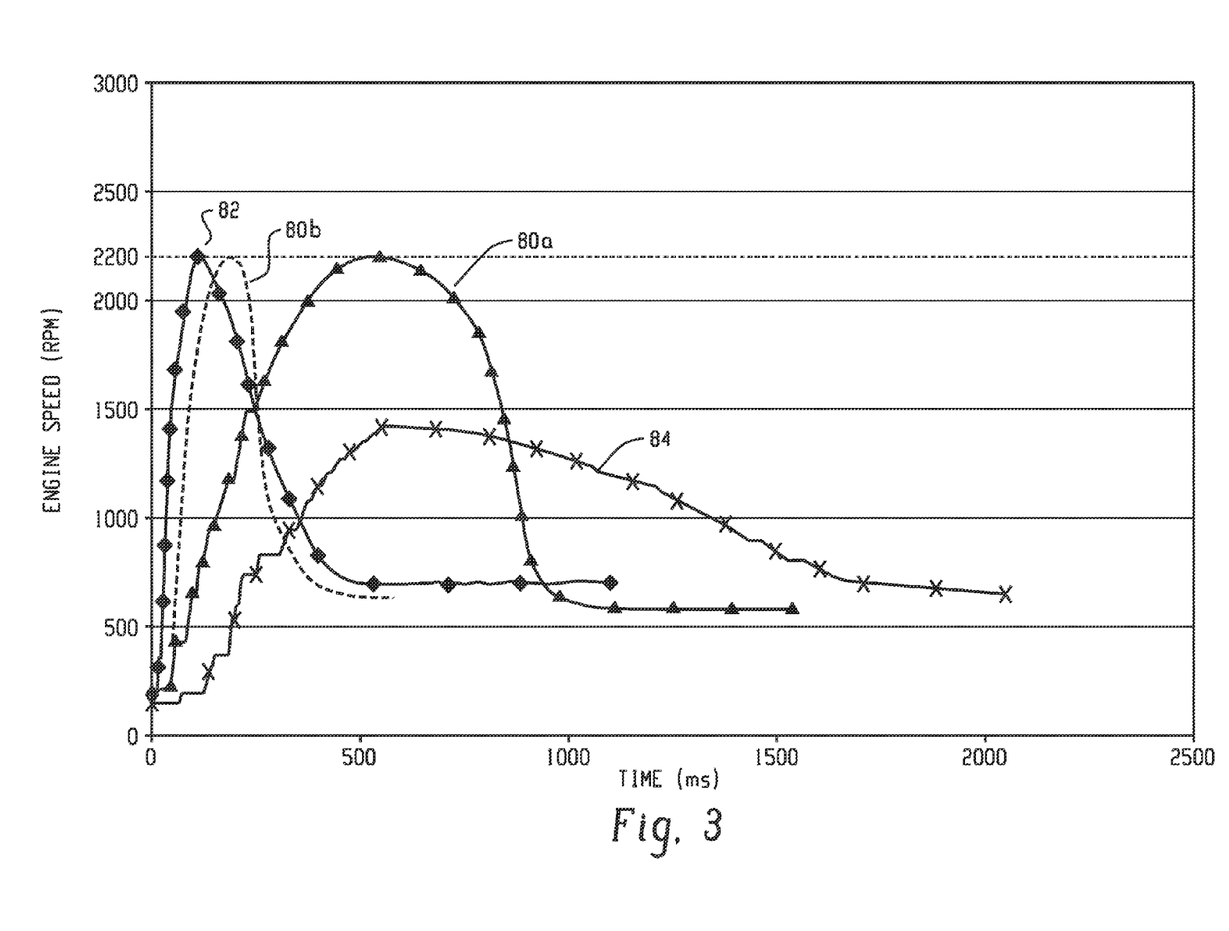
FIG. 3 is a timing chart showing a plurality of engine speed profiles, including profiles obtained by using the hybrid vehicle system with enhanced startup flare control of FIG. 2.

As best shown in FIG. 3, a first simulated engine speed profile shown as curve 80*a* for the vehicle 12 can thus be tailored to simulate or at least approach the engine speed profile of a supercar illustrated as curve 82. In particular, the curve 80*a* more closely matches the curve 82 than curve 84, which corresponds to a conventional engine speed profile. Specifically, curve 80*a* is achieved by applying a larger throttle input (e.g., opening the throttle to 5.7 degrees) on the vehicle 12 to drive the internal combustion engine 14 rapidly toward the desired peak engine speed (i.e., 2200 RPM). In one embodiment, the larger throttle input is obtained by opening the throttle to 5.7 degrees, which is higher than the throttle open angle of 2.7 degrees illustrated in FIG. 1B in association with the standard vehicle engine speed profile, though other throttle open angles could be used (e.g., other throttle open angles above 2.7 degrees). As shown, the left side of the curve 80*a* more rapidly increases over time than the curve 84, thus more closely approximating the curve 82. Upon obtaining the desired engine speed, which can be measured by the sensor 48 and relayed to the at least one control unit 50, the at least one control unit 50 controls the electric motor 18 so that the electric motor 18 becomes engaged with the internal combustion engine 14 to provide a drag force on the internal combustion engine 14. This drag force quickly reduces the engine speed of the internal combustion engine 14 back to the idle speed (e.g., about 700 RPM).

As shown in FIG. 3, such action can result in the right side of the curve 80*a* corresponding to a simulated vehicle engine speed profile more closely approximating the curve 82, at least as compared to curve 84. Advantageously, the peak engine speed for the curve 80*a* is approximately the same as the curve 82 (e.g., 2200 RPM), which is significantly higher than the curve 84, and the total rise and fall time for the curve 80*a* is less than 1000 msec, which is significantly less than the total rise and fall time (e.g., approximately 2000 msec) of the curve 84. In particular, the duration of the fall from peak engine speed to idle speed is greatly reduced in the curve 80*a* as compared to the curve 84 and thus better approaches the profile of the curve 82.

As also shown in FIG. 3, a second simulated engine speed profile shown as curve 80*b* for the vehicle 12 can be achieved that more closely simulates or approaches the engine speed profile of the curve 82. In particular, the curve 80*b* more closely matches the curve 82 than curve 84 (and more closely than curve 80*a*). Specifically, the curve 80*b* is achieved by applying a larger throttle input (e.g., opening the throttle to 5.7 degrees) on the vehicle 12 to drive the internal combustion engine 14 rapidly toward the desired peak engine speed (i.e., 2200 RPM). In addition, the at least one control unit 50 can control the electric motor 18 so that the electric motor 18 becomes engaged with the internal combustion engine to assist the internal combustion engine 14 in reaching the desired peak engine speed even more rapidly (i.e., the electric motor 18 provides an assisting force to the engine). The throttle open angles for the curve 80*b* can be as described above in association with the curve 80*a*. As shown, the left side of the curve 80*b* more rapidly increases over time than the curve 84 and than the curve 80*a*, thus even more closely approximating the curve 82. As with the curve 80*a*, upon reaching the desired engine speed for the curve 80*b*, the at least one control unit 50 can further control the electric motor 18 (e.g., reversing the electric motor 18) so that the electric motor 18 provides a drag force on the internal combustion engine 14 for quickly reducing the engine speed of the internal combustion engine 14 back to the idle speed (e.g., about 700 RPM).

As illustrated, such action can result in the right side of the curve 80b corresponding to another simulated vehicle engine speed profile more closely approximating the curve 82, at least as compared to curve 84 and curve 80a. Advantageously, the peak engine speed for the curve 80b is approximately the same as the curve 82 (e.g., 2200 RPM) and the total rise and fall time for the curve 80b is less than 500 msec, which is significantly less than the total rise and fall time of either the curve 84 (e.g., approximately 2000 msec) or the curve 80a (e.g., approximately 1000 msec). In particular, the duration of the fall from the peak engine speed to idle speed is greatly reduced in the curve 80b as compared to either the curve 84 or the curve 80a and thus better approaches the profile of the curve 82.

Figure 4:
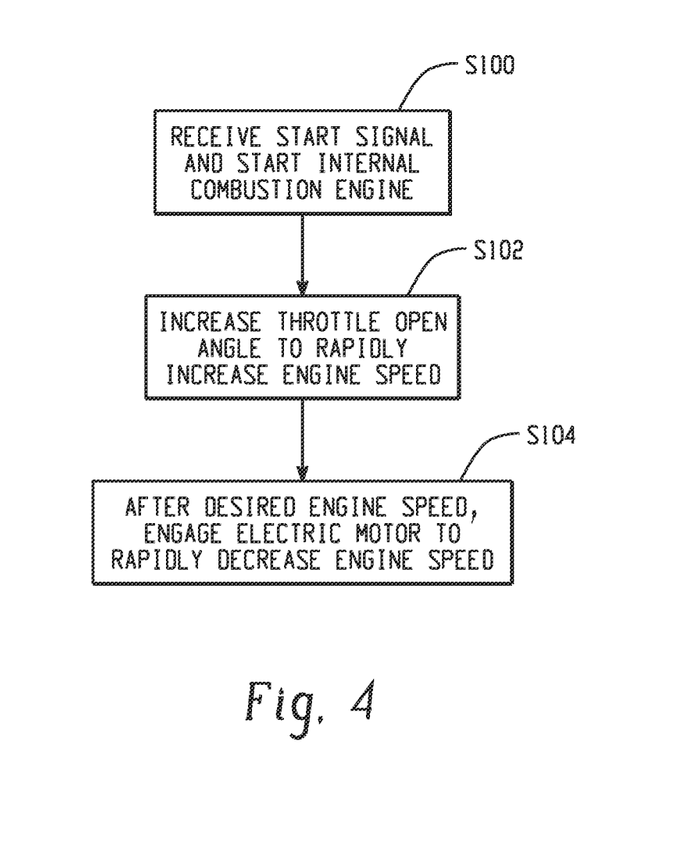
FIG. 4 is a block diagram showing a control method for enhancing startup flare control on a hybrid vehicle according to one exemplary embodiment.

With reference now to FIG. 4, a control method for enhancing startup flare control on a hybrid vehicle will be described according to one exemplary embodiment. In particular, the control method illustrated in FIG. 4 will be described in association with the hybrid vehicle system 10 depicted in FIG. 2, though this is not required and it is to be appreciated that the control method of FIG. 4 could be used with other hybrid vehicle systems. As shown in FIG. 4, the control method begins at S100 with a start signal being received for starting the internal combustion engine 14 from the start engine actuator 16 and then the internal combustion engine 14 is started. Next, at S102, a throttle open angle can be increased in response to the start signal being received by the at least one control unit 50 to rapidly increase engine speed upon starting of the internal combustion engine 14. In particular, the at least one control unit 50 can control the throttle control valve 40 via the throttle valve controller 44 and the throttle angle sensor 46 to increase the throttle open angle for the throttle control valve 40 so that engine speed of the internal combustion engine 14 is rapidly increased upon starting of the internal combustion engine 14.

Engine speed can be measured by the engine speed sensor 48 and communicated back to the at least one control unit 50 as already described hereinabove. After the desired peak engine speed is reached, as determined by the engine speed sensor 48 and communicated to the at least one control unit 50 for example, the electric motor 18 can be engaged with the internal combustion engine 14 to add the drag force on the internal combustion engine 14 thereby rapidly reducing engine speed at S104. This (i.e., increasing the throttle open angle and engaging the electric motor 18) can occur before driving of the vehicle 12. Though not illustrated in FIG. 4, the control method can additionally include monitoring the engine speed of the internal combustion engine 14 to precisely determine when the desired engine speed is reached. As mentioned, this can be done with the engine speed sensor 48 that communicates the measured engine speed to the at least one control unit 50. Alternatively, operating the electric motor 18 to apply the drag force on the internal combustion engine 14 can occur after a brief fixed amount of time (e.g., 200 msec) that is set to approximate the time at which the internal combustion engine 14 is expected to reach the desired peak engine speed.

Accordingly, by the control method of FIG. 4, the at least one control unit 50 receives the engine start signal from the start engine actuator 16, which can be a push-button start actuator, and initiates an engine start mode for starting the internal combustion engine 14. The at least one control unit 50 also commands the throttle valve controller 44 to increase the throttle open angle of the throttle control valve 40 disposed within the engine intake 42 associated with the internal combustion engine 14 after receiving the engine start signal from the start engine actuator 16. The at least one control unit 50 additionally commands engagement of the electric motor 18 with the internal combustion engine 14 after the desired engine speed is reached, such as measured by the engine speed sensor 48. Engaging the electric motor 18 does not occur until the engine speed of the internal combustion engine 14 reaches the desired peak engine speed (e.g., 2200 RPM).

When employed, the control method can further include receiving a mode selection signal from the mode selector switch 70 corresponding to a desired engine mode for the internal combustion engine. In one embodiment, the mode selector switch 70 is moveable between at least two positions with each position associated with a particular engine mode. When the mode selector switch is employed, the control method can also include setting the desired engine speed based on the mode selection signal.

Figure 5:
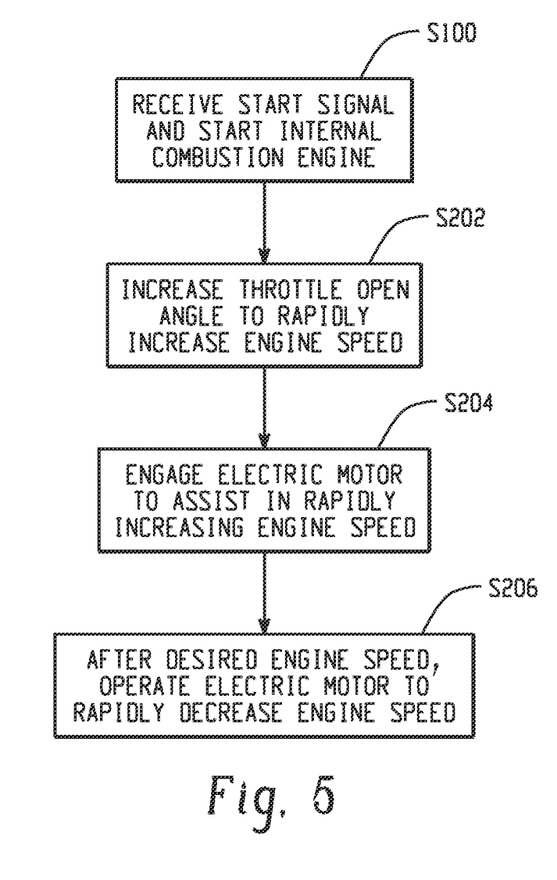
FIG. 5 is a block diagram showing a control method for enhancing startup flare control on a hybrid vehicle according to another exemplary embodiment.

With reference to FIG. 5, another control method for enhancing startup flare control on a hybrid vehicle will be described according to another exemplary embodiment. In particular, the control method illustrated in FIG. 5 will be described in association with the hybrid vehicle system 10 depicted in FIG. 2, though this is not required and it is to be appreciated that the control method of FIG. 5 could be used with other hybrid vehicle systems. As shown in FIG. 5, the control method begin at S200 with a start signal being received for starting the internal combustion engine 14 from the start engine actuator 16 and then the internal combustion engine 14 is started. Next, at S202, a throttle open angle can be increased in response to the start signal being received by the at least one control unit 50 to rapidly increase engine speed upon starting of the internal combustion engine 14. In particular, the at least one control unit 50 can control the throttle control valve 40 via the throttle valve controller 44 and the throttle angle sensor 46 to increase the throttle open angle for the throttle control valve 40 so that engine speed of the internal combustion engine 14 is rapidly increased upon starting of the internal combustion engine 14. Additionally, as indicated as S204, the electric motor 18 can be engaged with the internal combustion engine 14 to assist in rapidly increasing engine speed.

As described above, engine speed can be measured by the engine speed sensor 48 and communicated back to the at least one control unit 50 so that the at least one control unit 50 is apprised of when the internal combustion engine 14 reaches the desired peak engine speed. Once reached, the electric motor 18 can operated by the at least one control unit 50 (e.g., reversed), as indicated at S206, to add the drag force on the internal combustion engine 14 to thereby rapidly reduce engine speed S104. This step S206 can occur as described above for step S104 in the method of FIG. 4. Also like the method of FIG. 4, the control method of FIG. 5 can additionally include monitoring the engine speed of the internal combustion engine 14 to precisely determine when the desired engine speed is reached, though this step is not illustrated in FIG. 5.

Like the control method of FIG. 4, in the control method of FIG. 5, the at least one control unit 50 receives the engine start signal from the start engine actuator 16, which can be a push-button start actuator, and initiates an engine start mode for starting the internal combustion engine 14. The at least one control unit 50 also commands the throttle valve controller 44 to increase the throttle open angle of the throttle control valve 40 disposed within the engine intake 42 associated with the internal combustion engine 14 after receiving the engine start signal from the start engine actuator 16. Different from the method of FIG. 4, the at least one control unit 50 in the method of FIG. 5 additionally commands engagement of the electric motor 18 with the internal combustion engine 14 at S204 to assist in rapidly increasing engine speed to more rapidly reach the desired peak engine speed. Then, after the desired engine speed is reached, the electric motor 18 is operated (e.g., reversed) to rapidly decrease engine speed. Operating the electric motor 18 to rapidly decrease engine speed does not occur until the engine speed of the internal combustion engine 14 reaches the desired peak engine speed (e.g., 2200 RPM).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hybrid vehicle system with enhanced startup flare control, comprising:
   an internal combustion engine for providing motive vehicle power;
   a start engine actuator for starting the internal combustion engine;
   an electric motor selectively coupled to the internal combustion engine for generating electric power from the internal combustion engine;
   a throttle control valve disposed within an engine intake associated with the internal combustion engine, the throttle control valve arranged such that increasing an open angle of the throttle control valve increases an engine speed of the internal combustion engine; and
   at least one control unit operatively connected to the start engine actuator, the throttle control valve and the electric motor, the at least one control unit configured to start the internal combustion engine upon actuation of the start engine actuator, rapidly increase the open angle of the throttle control valve immediately upon starting the internal combustion engine rapidly to increase engine speed of the internal combustion engine to a desired peak engine speed, and then couple the electric motor to the internal combustion engine to rapidly decrease engine speed as soon as the internal combustion engine reaches a desired peak engine speed.

2. The hybrid vehicle system of claim 1 further including:
   an engine speed sensor arranged to sense the engine speed of the internal combustion engine and communicate the sensed engine speed to the at least one control unit.

3. The hybrid vehicle system of claim 1 further including:
   a battery operatively connected to the electric motor for being recharged by the electric motor; and
   the battery operatively connected to the electric motor for providing power thereto.

4. The hybrid vehicle system of claim 1 further including:
   a throttle valve controller for controlling the open angle of the throttle control valve, the throttle valve controller operatively connected to the at least one control unit for control thereby.

5. The hybrid vehicle system of claim 1 wherein the start engine actuator is a push-button start actuator.

6. The hybrid vehicle system of claim 1 further including:
   a mode selector switch for selecting a driving mode for the internal combustion engine, the mode selector switch operatively connected to the at least one control unit, the desired peak engine speed set according to the driving mode selected via the mode selector switch.

7. The hybrid vehicle system of claim 6 wherein the driving mode is a selected mode from at least two different driving modes.

8. The hybrid vehicle system of claim 1 wherein the internal combustion engine includes a multi-pin counterweight crankshaft.

9. The hybrid vehicle system of claim 1 wherein the desired peak engine speed corresponds to a driving mode input via a driving mode selector switch that is operatively connected to the at least one control unit.

10. The hybrid vehicle system of claim 1 wherein the at least one control unit is further configured to couple the electric motor to the internal combustion engine to assist in rapidly increasing the engine speed of the internal combustion engine when the open angle of the throttle control valve is increased.

11. A control method for enhancing startup flare control on a hybrid vehicle, comprising;
   receiving a start signal for starting an internal combustion engine from a start engine actuator and starting the internal combustion engine;
   increasing a throttle open angle in response to the start signal to rapidly increase engine speed upon starting of the internal combustion engine;
   engaging an electric motor with the internal combustion engine; and
   after a desired peak engine speed is reached due to the throttle open angle being increased in response to the start signal, operating the electric motor to add a drag force on the internal combustion engine thereby rapidly reducing engine speed.

12. The control method of claim 11 wherein engaging the electric motor with the internal combustion engine includes engaging the electric motor to assist in rapidly increasing the engine speed to the desired engine speed.

13. The control method of claim 11 further including:
   monitoring engine speed of the internal combustion engine to precisely determine when the desired engine speed is reached.

14. The control method of claim 11 wherein at least one control unit receives the engine start signal and initiates an engine start mode for starting the internal combustion engine, the at least one control unit also commands a throttle valve controller to increase the throttle open angle of a throttle valve disposed within the engine intake associated with the internal combustion engine after receiving the engine start signal, the at least one control unit additionally commanding engagement of the electric motor with the internal combustion engine.

15. The control method of claim 11 further includes:
   receiving a mode selection signal corresponding to a desired engine mode for the internal combustion engine; and
   setting the desired peak engine speed based on the mode selection signal.

16. The control method of claim 15 wherein the mode selection signal is received from a mode selector switch, the mode selector switch movable between at least two positions with each position associated with a particular engine mode.

17. The control method of claim 11 wherein increasing the throttle open angle and engaging the electric motor occurs before driving of the hybrid vehicle.

18. The control method of claim 11 wherein engaging the electric motor occurs until the engine speed of the internal combustion engine reaches an idle engine speed.

19. A startup flare control method for an internal combustion engine, comprising:
   receiving an engine start signal for the internal combustion engine;
   immediately upon starting of the engine, increasing a throttle open angle of a throttle valve associated with the internal combustion engine to rapidly increase engine speed of the internal combustion engine to a desired peak engine speed; and
   upon reaching the desired peak engine speed, engaging an electric motor with the internal combustion engine and operating an electric motor to reduce engine speed of the internal combustion engine to an idle engine speed.

20. The method of claim 19 further including:
   engaging the electric motor with the internal combustion engine and operating the electric motor to assist in rapidly increasing engine speed.

21. The method of claim 19 wherein the idle engine speed is less than 50% of the desired peak engine speed.

* * * * *